June 18, 1929.  J. A. JOHNSON  1,717,883
CASTER SOCKET BRACKET
Filed April 4, 1925   2 Sheets-Sheet 1
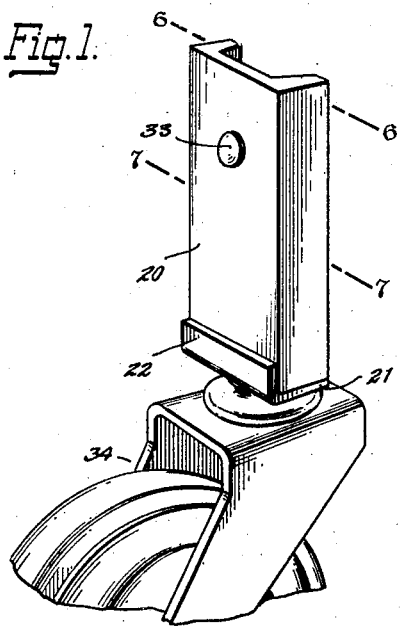
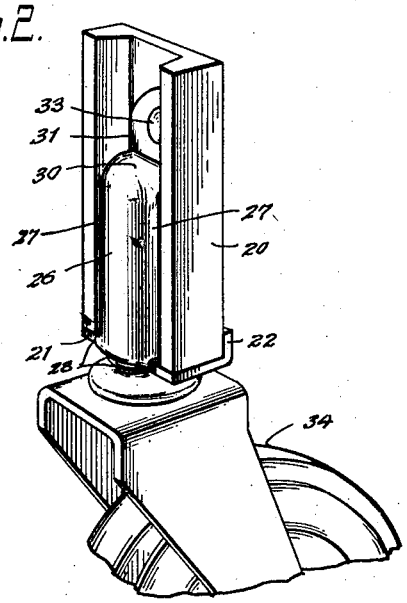
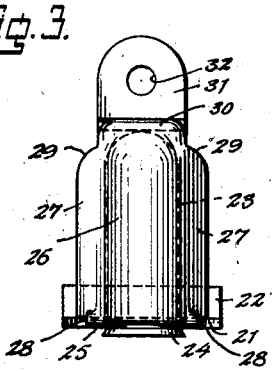
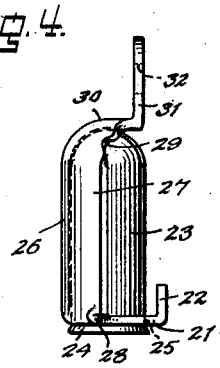
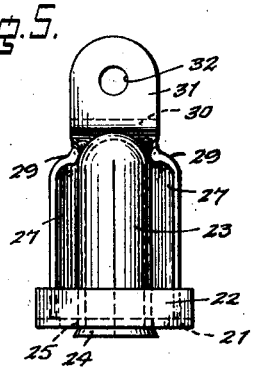
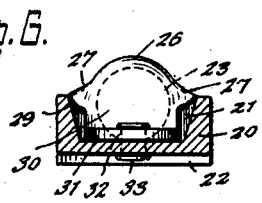
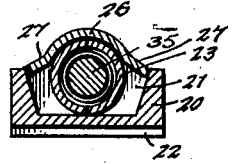
INVENTOR.
JOHN ADOLPH JOHNSON.
BY
ATTORNEY.

June 18, 1929.  J. A. JOHNSON  1,717,883
CASTER SOCKET BRACKET
Filed April 4, 1925   2 Sheets-Sheet 2
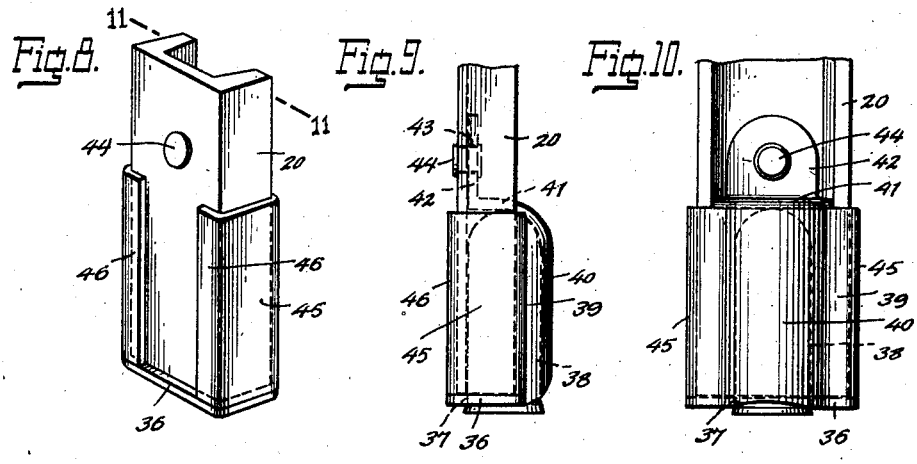
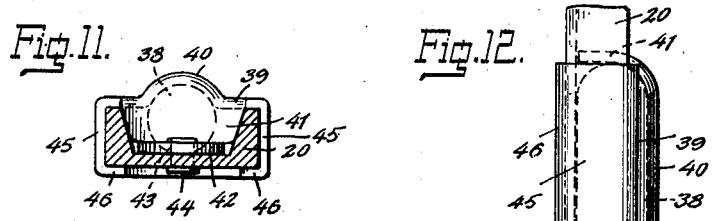
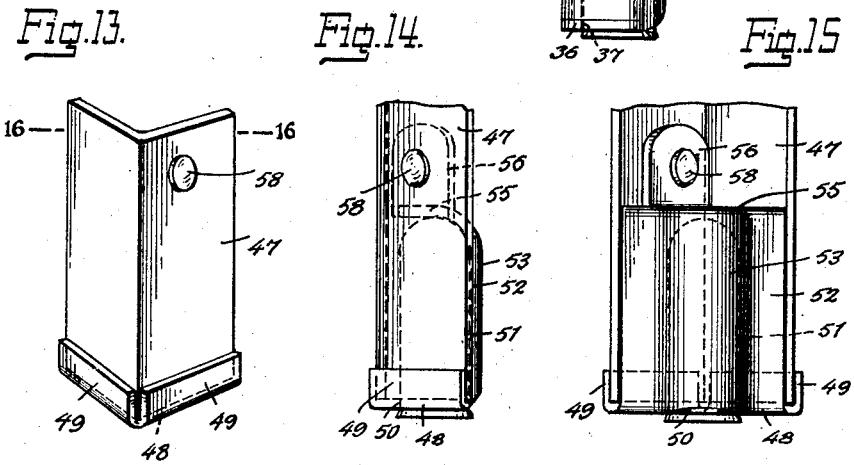
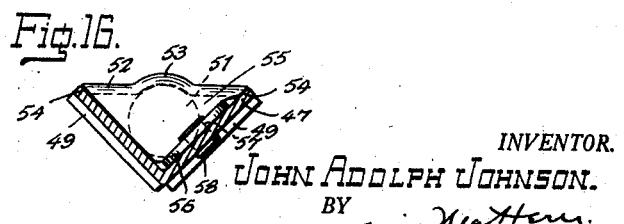
INVENTOR.
JOHN ADOLPH JOHNSON.
BY
ATTORNEY Patented June 18, 1929.

1,717,883

UNITED STATES PATENT OFFICE.

JOHN ADOLPH JOHNSON, OF MERIDEN, CONNECTICUT, ASSIGNOR TO THE BASSICK COMPANY, OF BRIDGEPORT, CONNECTICUT, A CORPORATION OF CONNECTICUT.

CASTER-SOCKET BRACKET.

Application filed April 4, 1925. Serial No. 20,594.

This invention relates to a caster socket bracket for furniture legs, or the like, and particularly such legs formed of channel and angle bar members, legs of this type being generally used upon metal structures, as hospital tables, metallic couches, washing machines, and the like.

An object of the invention is to provide a device of this character formed of sheet metal, which may be secured to the leg, or the like, by means of a single rivet, in a manner to provide a substantial, rigid and reliable support for the caster, and further, to provide a structure which will present a dirt and water proof enclosure at the end of the leg. A still further object is to provide a bracket including a caster pintle receiving socket, which in cooperation between the leg and the bracket will be rigidly supported against strains in all directions, so that the caster will thus be reliably mounted under all conditions of service.

Other objects are to provide a bracket of simple, reliable, and economical construction, which may be manufactured by efficient fabricating processes.

With the above and other objects in view, embodiments of the invention are shown in the accompanying drawings, and these embodiments will be hereinafter more fully described with reference thereto, and the invention will be finally pointed out in the claim.

In the drawings:

Fig. 1 is a perspective view, showing the front side of the lower end of a channel iron leg provided with a bracket, according to one embodiment of the invention, and also showing a caster fitted therein;

Fig. 2 is a perspective view, showing the rear side of the same;

Fig. 3 is a rear elevation of the bracket;

Fig. 4 is a side elevation thereof;

Fig. 5 is a front elevation of the same;

Fig. 6 is a horizontal sectional view, taken along the line 6—6 of Fig. 1;

Fig. 7 is a horizontal sectional view, taken along the line 7—7 of Fig. 1;

Fig. 8 is a perspective view, showing the front side of the lower end of a channel iron leg provided with a bracket, according to a modified form of the invention;

Fig. 9 is a side elevation thereof;

Fig. 10 is a rear elevation of the same;

Fig. 11 is a sectional view, taken along the line 11—11 of Fig. 8;

Fig. 12 is a side elevation of another modified form;

Fig. 13 is a perspective view, showing the front side of the lower end of an angle iron leg, provided with a bracket, according to a further modified form;

Fig. 14 is a side elevation thereof;

Fig. 15 is a rear elevation of the same; and

Fig. 16 is a sectional view, taken along the line 16—16 of Fig. 13.

Similar reference characters indicate corresponding parts throughout the several figures of the drawings.

Referring particularly to Figs. 1 to 7 of the drawings, the metallic furniture leg 20 is of channel form, and is adapted to have the caster socket bracket engaged and secured at its lower end upon the inner side. The bracket, according to the present embodiment of the invention, is formed or pressed from a sheet metal blank, and comprises a horizontally disposed flat base portion 21 of corresponding width to that of the leg, and provided at its forward edge with an upwardly bent flange 22 adapted to engage the front side of the leg. The socket member 23, which is of cylindrical form having a closed dome-shaped upper end and a flared flange 24 at its lower end, is inserted and secured by a force fit in an aperture 25 formed in the portion 21 in such inwardly spaced relation to the flange 22 that the forward surface of the socket member engages the inner surface of the leg, in the attached relation of the bracket. In practice this socket member is preferably formed of strip metal bent centrally upon itself, and shaped to cylindrical form as clearly shown in Fig. 5.

A rearward vertical bracket portion 26 is bent upwardly from the base portion 21, being pressed into curved cross-section so that it snugly engages and conforms to the rearward surface of the socket member, this portion being furthermore provided at each side with side flanges 27, extending in inclined relation forwardly, so that their vertical edges snugly engage the inner surfaces of the side flanges of the leg adjacent their rearward edges, the rearward edges of the flanges 27 meeting the rearward edges of the leg flanges, so that the rearward surface of the bracket is substantially flush with the rearward surface of said leg flanges. The lower ends of the flanges 27 extend in overlying relation to the upper surface of the base 21, and for this purpose the bend between the base and the vertical portion 26 is notched at each end, as at 28, while the upper ends of the flanges are curved inwardly to the side edges of the portion 26, as at 29.

A top portion 30 is bent inwardly from the upper end of the vertical portion 26 in crowned conforming relation over the rearward top portion of the socket member and in flat relation to the inner leg surface, where an upstanding flat securing ear 31 is bent upwardly therefrom, the forward surface of this ear being substantially in the vertical line of the socket member. The ear, which is adapted to engage flatly against the inner surface of the leg, is provided with an aperture 32 for engagement of the single rivet 33 which secures it to the leg.

The caster, indicated generally as 34, may be of any suitable type, and is provided with a pintle 35 for insertion in the socket.

The bracket, according to this embodiment of the invention, is attached by a single rivet, but at the same time so cooperates with the leg as to be reliably and rigidly supported against displacement in all directions, the flange 22 preventing displacement with respect to the depth of the leg, while the flanges 27 prevent displacement with respect to its width. As clearly indicated in Fig. 7, the socket is rigidly supported by the leg and bracket in its vertical position against tortional strains in all directions. The device furthermore presents a very neat appearance, the flange 22 providing a pleasing finish at the base of the leg, while the inner side of the bracket is free of any sharp or projecting portions, and entirely closes the socket member, so that the same is protected against the lodgement of dirt and water.

In Figs. 8 to 11 there is illustrated a modified form of the invention, in which the bracket consists of a flat horizontal base portion 36, having an aperture 37 in which the socket member 38 is engaged and secured, a vertical rearward portion 39 bent upwardly therefrom and curved in cross-section centrally, as at 40, to engage and conform to the rearward surface of the socket member, a top portion 41 bent inwardly over the upper end of the socket member, and a securing ear 42 bent upwardly from the top portion to engage the inner surface of the leg, being provided with an aperture 43 for the single securing rivet 44.

Side flanges 45 are bent forwardly from each of the vertical edges of the rearward portion 39 to engage the outer side surfaces of the leg, and forward flanges 46 are bent inwardly from the forward edges of said flanges 45 to engage the forward surface of the leg. The lower ends of the flanges 45 and 46 engage and abut the upper surface of the base, which is projected with respect to the leg.

In Fig. 12 there is illustrated a modification similar in construction to that shown in Figs. 8 to 11, but without the securing ear 42, this form of bracket being secured upon the leg frictionally by a force fit therewith.

In Figs. 13 to 16 a further modification is illustrated, adapted for attachment to an angle iron leg 47, and in which the base 48 of the bracket is of substantially triangular form, to engage and span the lower end of the leg, and is provided along its forward edges with upwardly bent flanges 49 adapted to engage the outer surface of the leg. The base is provided with an aperture 50 adapted to receive the socket member 51 in such spaced relation that in the attached relation of the bracket it engages the inner surfaces of both sides of the leg.

A rearward vertical portion 52 is bent upwardly from the rearward edge of the base, being curved centrally, as at 53, to engage and conform to the rearward surface of the socket member, and having its vertical side edges beveled, as at 54, and abutting the inner surfaces of the leg adjacent its rearward edges.

A triangular shaped top portion 55 is bent inwardly from the vertical portion, and has its edges engaged with the inner surface of the leg, and from one of said edges a vertical ear 56 is bent upwardly in contacting relation with one side of the leg, being provided with an aperture 57 through which an attaching rivet 58 is engaged and secured to the leg.

I have illustrated and described preferred and satisfactory embodiments of the invention, but it will be understood that changes may be made therein, within the spirit and scope thereof, as defined by the appended claim.

Having thus described my invention, what I claim and desire to secure by Letters Patent is:

In a caster socket bracket for attachment to an angle iron furniture leg or the like, the combination of a bracket member including a base portion adapted to be engaged with the lower end of the leg and having an aperture, a vertical rearward portion bent from the rearward edge of said base, flange means adapted to engage the front surface of said leg, a top thrust bearing portion bent inwardly from the upper edge of said vertical portion into contacting relation with said leg, and an upwardly extending securing portion bent upwardly from said top portion and adapted to engage and be secured to the inner side of said leg to form said thrust bearing portion into a rigid box structure with relation to said leg, and a socket member for a removable pintle inserted and secured in said aperture of the base portion engaging said vertical portion at one side and the inner surface of said leg at its opposed side, whereby it is rigidly supported transversely, its upper end having thrust bearing engagement with said top portion, and whereby it is rigidly supported vertically.

Signed at Meriden, in the county of New Haven and State of Connecticut, this 26th day of March, 1925.

JOHN ADOLPH JOHNSON.